United States Patent [19]

Drexhage et al.

[11] Patent Number: 5,214,164
[45] Date of Patent: May 25, 1993

[54] CYANINE DYES

[75] Inventors: Karl-Heinz Drexhage, Schanzenweg 50; Elisabeth Drexhage, both of Siegen, Fed. Rep. of Germany

[73] Assignees: Herbert Kübler; Karl-Heinz Drexhage, both of Fed. Rep. of Germany

[21] Appl. No.: 452,961

[22] Filed: Dec. 19, 1989

[30] Foreign Application Priority Data

Dec. 20, 1988 [DE] Fed. Rep. of Germany ....... 3842785

[51] Int. Cl.$^5$ .............................................. C07D 311/66
[52] U.S. Cl. .................................................... 549/405
[58] Field of Search ........................................ 549/405

[56] References Cited

U.S. PATENT DOCUMENTS

| | | | |
|---|---|---|---|
| 3,300,314 | 1/1967 | Rauner et al. | 96/89 |
| 3,671,251 | 6/1972 | Houle et al. | 96/89 |
| 4,247,799 | 1/1981 | Drexhage | 313/367 |
| 4,416,961 | 11/1983 | Drexhange | 430/7 |

FOREIGN PATENT DOCUMENTS 58-144833  8/1983  Japan .

OTHER PUBLICATIONS

Gavnilyuk et al., *Khimiya Geterotsiklicheskikh Soedinenii,* No. 3, pp. 304–308 (1983) (English translation at pp. 243–247).
Chem. Abstract 84:75718h, 1976.
Chem. Abstract 89:45061z (1978).
Detty, M. R. et al, "telluropyrylium dyes ... ", J. Org. Chem., 47, pp. 5235–5239 (1982).
Chem. Abstract 99:6859c (1983).
Chem. Abstract 99:72161v (1983).

*Primary Examiner*—Nicky Chan
*Attorney, Agent, or Firm*—Merchant, Gould, Smith, Edell, Welter & Schmidt

[57] ABSTRACT

The present invention relates to chemical substances having dye properties, or more particularly, to improved cyanine dyes and to their application in photographic bleaching processes. Preferably, a chromylium group on the hetero ring comprises either a substituted phenyl group or an alkyl group. More particularly, O-halogenated phenyl and t-butyl groups have proven to be advantageous substituents.

5 Claims, No Drawings

CYANINE DYES

The present invention relates to chemical substances possessing colouring properties, or, more particularly to cyanine dyes, and relates furthermore to the use of such substances in photographic bleaching processes.

The substances to which the present invention relates may be expressed by the general formula (I)

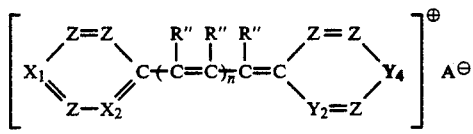

where:

$X_1$ or $X_2$ and $Y_1$ or $Y_2$ = oxygen, sulphur, selenium or tellurium, and whereby each of the remaining $X_2$ or $X_1$ and $Y_2$ or $Y_1$ (which is not O, S, Se or Te) = Z; Z = CR' or nitrogen; R', R" = a substitutent wherein each R' and R" is chosen from the following groups, independently of the other R' and R": substituted and unsubstituted hydrogen, including heterosubstituted alkyl, —cycloalkyl, —aryl, —heteroaryl and—alkylaryl; alkoxy, aryloxy, arylalkoxy; carboxylic acid,—ester, —amide and salts thereof; CN; $NO_2$; quaternized nitrogen (NR' having one or more R'"≠halogen; sulphonic acid and phosphonic acid, including derivatives and salts thereof; and

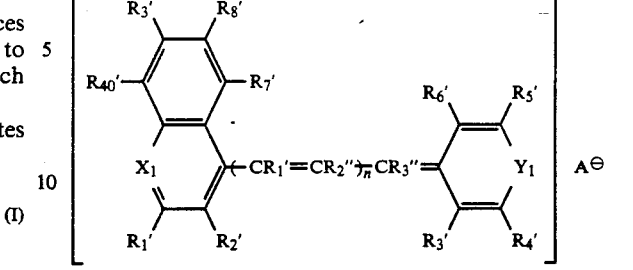

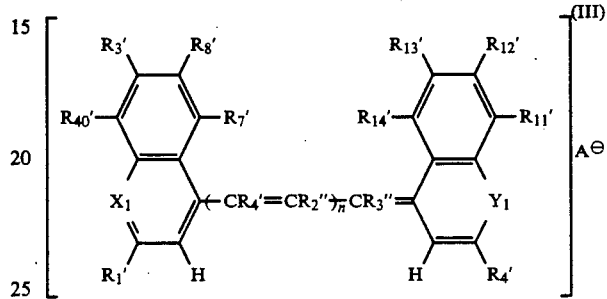

Alternatively, such heteroatoms may also assume ring positions 4 and 2' as in the proposed compound represented by general structure IV.

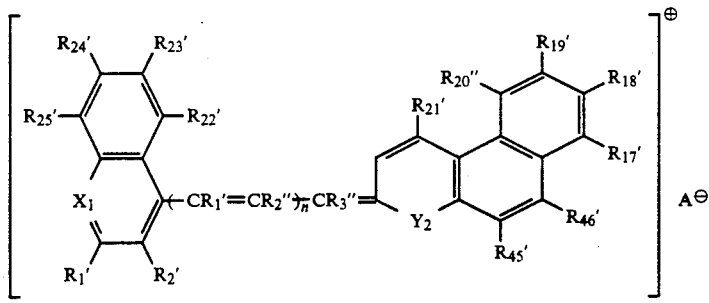

wherein two R' groups located on the same ring may bridge together to form a further unsubstituted alicyclic or aromatic ring; n=0 or 1; A=anion.

These substances may be prepared by using known techniques. The following are listed as examples: O. Riester, Dissertation, University of Bonn (1937) for n=0; H. Brockman et al., Ber. dt. Chem. Ges. 77, 529 (1944) for n=1.

The heteroatoms (oxygen, sulphur, selenium or tellurium), which are indicated in structure 1 by $X_1$, $X_2$, $Y_1$ and $Y_2$, may be placed in ring positions 4 and 4', as has been done for example in the proposed compounds expressed by structure II and III, Examples of the proposed compounds are discussed in the following disclosure.

It is equally likely for the heteroatoms oxygen, sulphur, selenium and tellurium to take ring positions 2 and 2° or 2 and 4'.

In positions 2, 2', 4 and 4° not occupied by O, S, Se, Te, there is present a CR' group or a nitrogen atom.

Although Z in general structure I substantially represents the CR' group, one or more of ring positions 3, 5 and 6 may be replaced by a nitrogen atom. These substances, which may also be synthesised by prior art techniques, are suitable for use as bleaching dyes as the following structure illustrates:

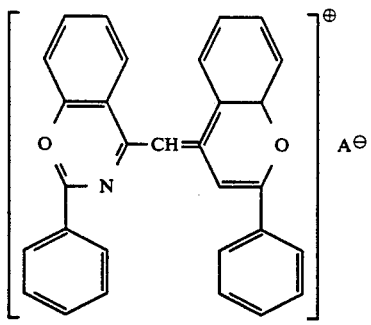

wherein lambda max=548 nm.

It is preferable that one or more of the R" groups in expressions I to IV be hydrogen, however, there also exist stable compounds possessing good bleaching properties wherein one or more of the R" groups are, for example, substituted phenyl, t-alkyl, carboxyl, $CF_3$ or CN. Because of the steric requirements placed on mono or trimethylene chains, no substituents having large steric requirments may be used as an R" group, particularly if all three carbon atoms in the trimethine chain carry R" groups which are not hydrogen.

In general, it can be assumed that substituents advantageously influencing dye properties may be formed with every R' and R" group.

Some of the requirements listed in this application, being already known, have not been claimed as novelty.

Cyanine dyes, as expressed by structure A, have already been described in "Khimiya Geterotsiklicheskikh Soedinenii" 1983 (3), 304–308.

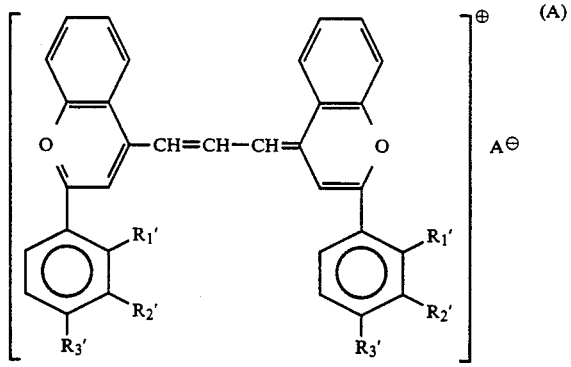

(A)

wherein $R'_1$, $R'_2$ and $R'_3$ may each be H at the same time or alternatively $R'_1$ or $R'_2$ or $R'_3$=—$OCH_3$ or $R'_1$=—OH. The bleaching properties of such dyes have not been investigated in this pre-patent document.

Cyanine dyes having chromylium or thiachromylium groups are also listed in various patents obtained by the Eastman Kodak Company. These will be discussed further in the present disclosure.

Although first suggested in 1900, the production of colour photographs by selectively bleaching individual dyes in a mixture, a deceptively simple process, has not achieved any practical significance until the present day, despite the early availability of a suitable photosensitiser in N-allylthiourea, a compound easily removed by water, and capable of facilitating the fixing of a photograph.

The main drawback of this prior art process is that conventional dyes bleached too slowly and left a coloured, mostly yellow-brown residue.

The dyes from the Eastman Kodak Company as disclosed in DE-OS 29 03 287 and U.S. Pat. No. 4,247,799 are ill-suited for the production of colour photographs and/or colour photocopies, since it has been established that the rapid-bleaching dyes leave a dark yellow-brown residue during the course of bleaching. Colour reproduction is consequently poor, and in particular, the white areas on the photograph appear to be yellow-brown in colour. An example of a known dye, described in U.S. Pat. No. 4,247,799, is referred to in example 1 as No. III. The negative impact of the prior art method upon the bleaching process used in the manufacture of colour filter assemblies for CCD's, is minimal because 100% transmission is not required, which lessens the effect of colour residue deposition. Other dyes are described in U.S. Pat. Nos. 3,300,314 and 3,671,251 as well as in JP patent 61-83533 and JP patent application No. 27781/1982.

The objects of the present invention are the creation of new cyanine dyes and identification of a method suitable for preparing such dyes that reduces the amount of colour residue deposited during the photographic bleaching process, affords increased light sensitivity and reduces bleaching times.

These deficiencies have been resolved by the cyanine dyes described in the independent claims.

A precise colour tone may be achieved by use of the proposed dyes. Since the photographic bleaching process admits the combination of more than three dyes—in contrast to most of the other colour photography processes—the simultaneous employment of the proposed cyanine dyes allows heretofore unattainable true colour reproduction.

The proposed dyes, which are structurally related to the prior art (Thia-)chromylium dyes, distinguish themselves from the latter largely by increased—in some cases substantially—light sensitivity and, more particularly, by their tendency to deposit, following the bleaching process, reduced or hardly perceptible amounts of residue. The colour film inevitably connected with use of the known dyes is practically non existent if the best of the proposed dyes are used; for example, the value of $E_\infty(450)=0.01$ mentioned later in this disclosure signifies a barely perceptible amount of colour residue.

The proposed dyes are thus suited for use in the preparation of all kinds of colour reproduction, for example colour proofing in printing plate manufacture; assembly of colour filter equipment; monochrome copying in a wide variety of colours and, more particularly, in the manufacture of photographic-quality colour copies. The proposed dyes, when used in the diazo process, eliminate the ever-present, annoying smell of ammonia.

The dyes disclosed in the above-noted Eastman Kodak prepublication are expressed by the general structures II or III, where $X_1$, $Y_1$=oxygen, $R'_2$, $R'_3$, $R'_6$ and $R'_7$-$R'_{14}$=hydrogen and $R''_1$-$R''_3$=hydrogen.

In the prior art monomethenylcyanines (n=0), $R'_1$ and $R'_4$ (structure III) or $R'_1$, $R'_4$ and $R'_5$ (structure II) are unsubstituted phenyl. The above-noted publications disclose a compound possessing two pyrylium groups as the sole trimethine dye (n=1). These prior art substances are not being claimed as such.

Without limiting the invention to any one theory in particular, it is currently assumed that the steric requirements of substitution on the ring are quintessential to the superiority of the proposed dyes.

Where phenyls are substituted on the ring, it is apparently most advantageous to use bulky and, if possible, electron withdrawing functional groups in one or both of the ortho positions on the phenyl ring. Certain groups such as, for example, $CF_3$, can be placed with advantage in almost any position in the phenyl ring. Alternatively, an alkyl, or more particularly, a t-butyl group could be used instead of a phenyl group.

COOH and —COOR groups have also proved very advantageous as substituents (instead of phenyl and alkyl). The preferred substituents have also proved advantageous if bonded to a methine group.

Because little is known about the dynamics of the photochemical bleaching reaction, it is impossible to set forth, with any degree of certainty, the effects of the present invention upon discrete parameters of the substitution model. Prior art models in no way anticipate however the degree of advantages attainable by using the present invention.

Various tests aimed at comparing conventional dyes with those proposed will next be described in detail.

After conventional and proposed dyes were synthesised using suitable conventional techniques, their absorption maxima (lambda max) were measured in a dilute solution of 1,2-dichloroethane.

The light sensitivity and the amounts of colour-distorting bleaching residues were determined by means of the following technique:

100 g cellulose acetate-hydrogen phthalate, 40 g polyethylene glycol, having an average molecular weight of 2000, ca 2 g of the dye being used and 40 g N-allyl-N'-(hydroethylthiourea were dissoved in 11 methylglycol. The resulting solution was spread with a spreading blade onto a polyester film to a thickness of 0.1 mm. After evaporation of the solvent, the resulting light sensitive film had a thickness of approx. 20 μm. The amount of dye used was selected to give the film an optical thickness of between 1.8 and 2.2 at the absorption maximum.

The film was then exposed to a 150 Watt halogen lamp through an IR-absorbing filter. The time t, during which the optical thickness at the absortion maximum decreased from a value of 2,0 to 1,0, was determined. Hence a smaller value of t shown in the following tables always indicates a correspondingly higher light sensitivity. The "t" given in the tables is only a relative value and may, therefore, depending on the lighting conditions, indicate seconds or minutes.

After the dye was completely bleached out, the remaining dye, which could be bleached out no further, was measured spectrophotometrically, to yield a residual optical thickness reading at a wavelength of 450 nm, which is given in the tables as "$E_\infty(450)$", a value that can be used as a benchmark for the thickness of the yellow colour following complete photochemical degradation of a dye; optimally, $E_\infty(450)=0$, where no yellow colour remains.

Firstly, the samples in Table 1 from number 1 to 28, were reviewed. Sample 1 is a prior art Eastman Kodak dye as expressed by the general structure III, wherein $X_1$ and $Y_1$=oxygen, $R'_1$ and $R'_4$=unsubstituted phenyl, and where all other $R'$ and all $R''$=hydrogen.

Samples 2 to 28 are also expressed by the general structure (III), wherein $X_1$, $Y_1$=oxygen; $R'_1$, $R'_4$=phenyl, all other $R'$ and all $R''$=hydrogen and n=0. As is apparent from Table 1, various substitutions on the phenyl group $R'_1$ were tested and partly combined with similar substitutions on the phenyl group $R'_4$.

TABLE 1

| Sample No. | Substitution on $R'_1$ (= phenyl) | | | | | Substitution on $R'_4$ (= phenyl) | | | | | λmax [nm] | t | $E_\infty$ (450) |
|---|---|---|---|---|---|---|---|---|---|---|---|---|---|
| | (o) | (m) | (p) | (m) | (o) | (o) | (m) | (p) | (m) | (o) | | | |
| 1 | | | | | | | | | | | 603 | 20 | 0,05 |
| 2 | F | | | | | | | | | | 599 | 18 | 0,04 |
| 3 | Cl | | | | | | | | | | 592 | 17 | 0,03 |
| 4 | | Cl | | | | | | | | | 601 | 20 | 0,05 |
| 5 | Br | | | | | | | | | | 590 | 15 | 0,03 |
| 6 | I | | | | | | | | | | 588 | 15 | 0,03 |
| 7 | Cl | | | | | Cl | | | | | 582 | 12 | 0,02 |
| 8 | Cl | | | | | | | | Cl | | 595 | 18 | 0,03 |
| 9 | Br | | | | | Br | | | | | 582 | 10 | 0,02 |
| 10 | | | Cl | | | | | | | | 593 | 18 | 0,04 |
| 11 | Cl | | | Cl | | | | | | | 591 | 17 | 0,03 |
| 12 | Cl | Cl | Cl | | | | | | | | 589 | 18 | 0,03 |
| 13 | Cl | | | | Cl | | | | | | 583 | 14 | 0,02 |
| 14 | Cl | | | | Cl | Cl | | | | Cl | 574 | 7 | 0,01 |
| 15 | Cl | | | | F | | | | | | 586 | 16 | 0,03 |
| 16 | Cl | | | | F | Cl | | | | Cl | 576 | 11 | 0,02 |
| 17 | | $CF_3$ | | | | | | | | | 597 | 16 | 0,06 |
| 18 | | $CF_3$ | | | | | $CF_3$ | | | | 598 | 12 | 0,06 |
| 19 | | $CF_3$ | | $CF_3$ | | | | | | | 594 | 14 | 0,07 |
| 20 | | $CF_3$ | $CF_3$ | | | | | | | | 604 | 10 | 0,05 |
| 21 | | CN | | | | | | | | | 601 | 20 | 0,10 |
| 22 | | | CN | | | | | | | | 607 | 25 | 0,12 |
| 23 | $NO_2$ | | | | | | | | | | 586 | 13 | 0,12 |
| 24 | | $NO_2$ | | | | | | | | | 597 | 20 | 0,08 |
| 25 | $CH_3$ | | | | | | | | | | 592 | 15 | 0,05 |
| 26 | $CH_3$ | | | | | Cl | | | | Cl | 575 | 12 | 0,04 |
| 27 | $CH_3$ | | $CH_3$ | $CH_3$ | | | | | | | 583 | 21 | 0,03 |
| 28 | $CH_3$ | $CH_3$ | $CH_3$ | | Cl | | | | | Cl | 570 | 16 | 0,02 |

Sample No. 14 yielded the best results with practically a threefold shorter bleaching time and a fivefold reduction in the amount of residual yellow tone. In this proposed dye, both phenyl groups $R'_1$, $R'_4$ were each substituted with chlorine at both ortho positions.

Equally good results were obtained by substitutinq both phenyl groups $R'_1$ and $R'_4$ at one ortho position with bromine (sample $N_o$ 9)

Table 1a lists the results from samples numbered 85-96. These samples are expressed by general structure III wherein n=O, X and Y=oxygen. As in the case of samples 1 to 28, $R'_1$ and $R'_4$ were formed using phenyl groups; in the cases of samples 87 and 88, the phenyl group $R'_1$ was substituted with halogen, whereas both phenyl groups $R'_1$ and $R'_4$ were unsubstitued in samples 85, 86 and 89 to 96. In contrast to samples 1 to 28, one or more of the substituents $R'_7$ to $R'_{14}$ in samples 85-96, which were hydrogen, were replaced by halogen atoms, or, as in the case of sample 96, by methyl groups.

Sample No. 87, which is comparable to sample No. 5, yielded after the same bleaching time a correspondingly low amount of residual yellow colour. Sample No. 88, which is comparable to sample No. 11, demonstrated a somewhat shorter bleaching time with larger amounts of bleaching residue.

By and large, all samples listed in Table 1a up to the methyl substituted sample 96 demonstrated shorter bleaching times compared with the prior art dye (sample No. 1) while yielding the same amount of bleaching residue.

Samples 90 to 92, wherein $R'_7$=Cl, were too unstable to make a determination of bleaching time and bleaching residue.

group; the substituent $R'_4$ is phenyl, substituted if necessary. $R'_8$ and $R'_{10}$=Cl in two samples.

Good results were obtained with the t-butyl group as substituent $R'_1$. Although the bleaching times were somewhat longer, the amount of residual yellow colour was considerably lower compared with the prior art dye (Sample 1).

Particularly good results were obtained from samples 99, 100 and especially 101, wherein $R'_1$=COOH and both ortho positions on the phenyl group $R'_4$ were substituted with chlorine.

TABLE 2

| Sample No. | $R'_1$ | Substitution on $R'_4$ (= Phenyl) | | | | | Further substitution | | $\lambda$max [nm] | t | $E_\infty$ (450) |
|---|---|---|---|---|---|---|---|---|---|---|---|
| | | (o) | (m) | (p) | (m) | (o) | $R'_8$ | $R'_{10}$ | | | |
| 29 | Methyl | | | | | | | | 572 | 50 | 0,08 |
| 30 | Methyl | Cl | | | | Cl | | | 555 | 30 | 0,05 |
| 31 | i-Propyl | | | | | | | | 573 | 40 | 0,06 |
| 32 | i-Propyl | Cl | | | | Cl | | | 557 | 25 | 0,05 |
| 33 | Cyclohexyl | | | | | | | | 575 | 40 | 0,06 |
| 34 | Cyclohexyl | Cl | | | | Cl | | | 563 | 25 | 0,05 |
| 35 | t-Butyl | | | | | | | | 574 | 30 | 0,03 |
| 36 | t-Butyl | Cl | | | | | | | 565 | 25 | 0,03 |
| 37 | t-Butyl | Br | | | | | | | 563 | 25 | 0,03 |
| 38 | t-Butyl | Cl | | | | Cl | | | 557 | 25 | 0,03 |
| 39 | t-Butyl | Cl | | | | F | | | 562 | 40 | 0,03 |
| 40 | t-Butyl | CH$_3$ | | CH$_3$ | | CH$_3$ | | | 558 | 35 | 0,03 |
| 41 | 1-Adamant. | | | | | | | | 577 | 60 | 0,05 |
| 42 | 1-Adamant. | Cl | | | | Cl | | | 559 | 50 | 0,05 |
| 97 | t-Butyl | | | | | | Cl | Cl | 579 | 25 | 0,04 |
| 98 | t-Butyl | Cl | | | | Cl | Cl | Cl | 570 | 22 | 0,03 |
| 99 | COOH | | | | | | | | 584 | 35 | 0,02 |
| 100 | COOCH$_3$ | | | | | | | | 580 | 30 | 0,02 |
| 101 | COOH | Cl | | | | Cl | | | 578 | 25 | 0,01 |

An equally, very distinct, attenuation in the bleaching yellow tone is obtained with the dyes given in Table 3; this is especially distinct for $R'_1$=CONH$_2$, (Compare Sample No. 103).

Samples 43, 102 and 103 correspond to the samples in Table 2, however $R'_4$ is t-butyl instead of phenyl.

TABLE 3

| Sample No. | $R'_1$ | $R'_4$ | lambda max [nm] | t | $E_\infty$ (450) |
|---|---|---|---|---|---|
| 43 | t-Butyl | t-Butyl | 547 | 30 | 0.02 |
| 102 | COOCH$_3$ | t-Butyl | 558 | 30 | 0.02 |
| 103 | CONH$_2$ | t-Butyl | 558 | 25 | 0.01 |

TABLE 1a

| Sample No. | Substitution on $R'_1$ (= Phenyl) | | | | | Further substitution in accordance with structure III | | | | | | | | $\lambda$max [nm] | t | $E_\infty$ (450) |
|---|---|---|---|---|---|---|---|---|---|---|---|---|---|---|---|---|
| | (o) | (m) | (p) | (m) | (o) | $R'_7$ | $R'_8$ | $R'_9$ | $R'_{10}$ | $R'_{11}$ | $R'_{12}$ | $R'_{13}$ | $R'_{14}$ | | | |
| 85 | | | | | | | Cl | | Cl | Cl | | Cl | | 627 | 10 | 0,05 |
| 86 | | | | | | | Cl | | Cl | | | | | 610 | 10 | 0,09 |
| 87 | Br | | | | | | Cl | | Cl | | | | | 593 | 15 | 0,03 |
| 88 | Cl | | Cl | | | | Cl | | Cl | | | | | 595 | 15 | 0,06 |
| 89 | | | | | | | | Cl | Cl | | | | | 607 | 15 | 0,07 |
| 90 | | | | | | Cl | Cl | | | | | | | 618 | - instabil - | |
| 91 | | | | | | Cl | | | Cl | | | | | 616 | - instabil - | |
| 92 | | | | | | Cl | Cl | Cl | | | | | | 622 | - instabil - | |
| 93 | | | | | | | Cl | | | | | | | 608 | 15 | 0,06 |
| 94 | | | | | | | Br | | | | | | | 609 | 13 | 0,06 |
| 95 | | | | | | | Br | | Br | | | | | 605 | 13 | 0,08 |
| 96 | | | | | | | CH$_3$ | | CH$_3$ | | | | | 603 | 30 | 0,05 |

Table 2 lists the results of additional experiments on samples 29 to 42 and 97 to 101, as well as dyes corresponding to the general structure III wherein X and Y=oxygen. Such dyes differ from samples 1 to 28 by having an alkyl group or a carboxylic acid or -ester group as the substituent R' rather than the phenyl Table 4 shows the results that were obtained for samples 44 to 53 and 104. These dyes correspond to general structure III wherein n=0 and $X_1$=oxygen, however, $Y_1$=sulphur, $R'_1$ and $R'_4$ are phenyl groups. In the case of samples 44 to 53, all the other R' and R"=hydrogen;

in the case of sample 104, R'$_8$ and R'$_{10}$=Cl, and all other R', R''=H.

Sample 44 is a prior art dye in which the R'$_1$ and R'$_4$ are unsubstituted phenyl.

Each substitution of the phenyl group lead to a decreased bleaching time and an attenuated yellow tone. Sample 51 yielded the shortest bleaching time and the lowest amount of remaining yellow tone; again in this dye, both phenyl groups R'$_1$, R'$_4$ were substituted by chlorine in both ortho positions.

For the purposes of this experiment, the monomethine to trimethine compounds were omitted.

Table 6 shows the properties of samples 57 to 61 and 107 to 109 corresponding to general structure III wherein n=1 and X$_1$ as well as Y$_1$=oxygen. R'$_1$ and R'$_4$ are phenyl groups, and in the case of sample number 57 unsubstituted phenyl. For samples 58 to 61 and 107 to 109, R'$_1$ and R'$_4$ are substituted phenyl. For samples 57 to 61, all the other R' and R''=H; for samples 107 to 109 individual substitutents R'$_7$ to R'$_{14}$=CH$_3$, and all the

TABLE 4

| Sample No. | Substitution on R'$_1$ (= phenyl) | | | | | Substitution on R'$_4$ (= phenyl) | | | | | lambda max [nm] | t | E$_\infty$ (450) |
|---|---|---|---|---|---|---|---|---|---|---|---|---|---|
| | (o) | (m) | (p) | (m) | (o) | (o) | (m) | (p) | (m) | (o) | | | |
| 44 | | | | | | | | | | | 652 | 90 | 0,06 |
| 45 | Cl | | | | | | | | | | 639 | 55 | 0,04 |
| 46 | Cl | Cl | | | | | | | | | 641 | 65 | 0.05 |
| 47 | Br | | | | | | | | | | 638 | 50 | 0,03 |
| 48 | I | | | | | | | | | | 638 | 50 | 0,03 |
| 49 | Cl | | | | | | | Cl | | | 633 | 20 | 0,02 |
| 50 | Cl | | Cl | | | | | Cl | | | 622 | 15 | 0,02 |
| 51 | Cl | | Cl | | | | | Cl | | Cl | 606 | 12 | 0,02 |
| 52 | | CF$_3$ | | | | | | | | | 645 | 35 | 0,05 |
| 53 | | CN | | | | | | | | | 645 | 40 | 0,08 |
| 104 | | | R'$_1$, R'$_4$ = unsubstituiertes Phenyl; R'$_8$, R'$_{10}$ = Cl | | | | | | | | 653 | 50 | 0,04 |

Table 5 likewise gives the results for samples 54 to 56, which correspond to structure III wherein n=O, X$_1$ and Y$_1$=sulphur, R'$_1$ and R'$_4$=phenyl, all other R' and R''=H.

TABLE 5

| Sample No. | Substitution on R'$_1$ (= phenyl) | | | | | Substitution on R'$_4$ (= phenyl) | | | | | lambda max [nm] | t | E$_\infty$ (450) |
|---|---|---|---|---|---|---|---|---|---|---|---|---|---|
| | (o) | (m) | (p) | (m) | (o) | (o) | (m) | (p) | (m) | (o) | | | |
| 54 | | | | | | | | | | | 699 | 100 | 0.08 |
| 55 | Cl | | | | | Cl | | | | | 684 | 80 | 0.03 |
| 56 | Br | | | | | Br | | | | | 683 | 70 | 0.03 |

Sample 54 is a prior art dye wherein R'$_1$ and R'$_4$=unsubstituted phenyl. Chloro- or bromo substitution at the ortho position of the phenyl residue yields decreased bleaching times and drastically diminished residual yellow colour.

Table 5a shows the results obtained for samples 105 and 106. The dyes again correspond to general structure III wherein n=O and R'$_1$, R'$_4$=unsubstituted phenyl. X$_1$ is sulphur; Y$_1$ is oxygen. In sample 105, R'$_{10}$=Cl; in sample 106, R'$_{10}$=Br. All the other R' and R'' are hydrogen.

TABLE 5a

| Sample No. | R'$_{10}$ | lambda max | t | E$_\infty$ (450) [nm] |
|---|---|---|---|---|
| 105 | Cl | 654 | 80 | 0.05 |
| 106 | Br | 657 | 70 | 0.04 |

TABLE 6

| Sample No. | Substitution on R'$_1$ (= Phenyl) | | | | | Substitution on R'$_4$ (= Phenyl) | | | | | Further substitution in accordance with structure II | | | | | | | | λmax [nm] | t | E$_\infty$(450) |
|---|---|---|---|---|---|---|---|---|---|---|---|---|---|---|---|---|---|---|---|---|---|
| | (o) | (m) | (p) | (m) | (o) | (o) | (m) | (p) | (m) | (o) | R'$_7$ | R'$_8$ | R'$_9$ | R'$_{10}$ | R'$_{11}$ | R'$_{12}$ | R'$_{13}$ | R'$_{14}$ | | | |
| 57 | | | | | | | | | | | | | | | | | | | 716 | 200 | 0,08 |
| 58 | Br | | | | | Br | | | | | | | | | | | | | 684 | 30 | 0,02 |
| 59 | Cl | | Cl | | | Cl | | Cl | | | | | | | | | | | 674 | 3 | 0,01 |
| 60 | CH$_3$ | | | | | CH$_3$ | | | | | | | | | | | | | 691 | 100 | 0,01 |
| 61 | CH$_3$ | CH$_3$ | CH$_3$ | CH$_3$ | CH$_3$ | CH$_3$ | | | | | | | | | | | | | 672 | 14 | 0,01 |
| 107 | Cl | | Cl | | | Cl | | Cl | | | CH$_3$ | | CH$_3$ | | CH$_3$ | | | CH$_3$ | 685 | 35 | 0,02 |
| 108 | Cl | | Cl | | | Cl | | Cl | | | | CH$_3$ | | | | CH$_3$ | | | 680 | 20 | 0,01 |
| 109 | CH$_3$ | CH$_3$ | CH$_3$ | CH$_3$ | CH$_3$ | CH$_3$ | CH$_3$ | | | | | CH$_3$ | | | CH$_3$ | | | CH$_3$ | 683 | 90 | 0,02 |

Also of general structure III, the dyes corresponding to samples 112 and 113 have the following structures:

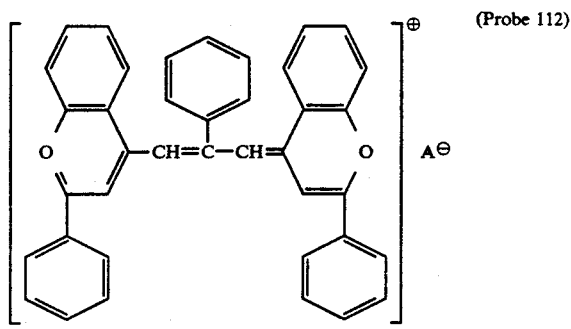

(Probe 112)

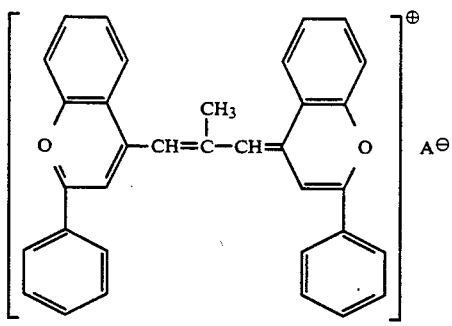

(Probe 113)

The dye corresponding to sample 112 has already been disclosed in Japanese Patent Application No. 27781/1982 cited at the beginning of the present application. The dye corresponding to sample 113 is distinguished from this prior art dye by the fact that $R''_2$ is methyl instead of phenyl.

Sample 112 yielded max=727 nm; t=50 and $E_\infty(450)=0.09$. Sample No. 113 yielded lambda max=730 nm; t was greater than 500 which meant that $E_\infty(450)$ could not be determined.

The foregoing experiments demonstrate that dyes having $R''$=phenyl are better suited as bleaching dyes than are those wherein $R''$=alkyl. In view of the substituent effects demonstrated by the dyes investigated above it can be assumed that $R''$=substituted phenyl especially with orthohalogen substituted phenyl, t-alkyl or carboxyl (-derivative) yields substantially better properties compared to the prior art dye corresponding to sample 112.

Especially outstanding are the properties of samples 59 and 108 in which both phenyl groups $R'_1$ and $R'_4$ are chlorinated in both ortho positions. Compared to sample 57 as a reference substance, the bleaching time in the case of sample 59 is reduced by nearly a factor of 70 and the residual yellow tone is reduced by about a factor of 8. It is instructive in this respect to make a comparison with samples 1 and 14 listed in Table 1.

Table 7 shows the results for samples 62 to 64, 110 and 111. These dyes again correspond to structure III wherein n=1 and $X_1$ as well as $Y_1$ =oxygen. $R'_1$ and $R'_4$ in such dyes are not phenyl groups, but rather alkyl groups. For samples 62 to 64 all the other $R'$ and $R''$=H; for samples 110 and 111, individual substituents $R'_7$ to $R'_{14}$ are Cl or $CH_3$ while the remaining $R'$ and $R''$=H. The best result was obtained by using t-butyl as substituents $R'_1$ and $R'_4$ (samples 63 and 110).

TABLE 7

| Sample No. | $R'_1$ | $R'_4$ | Further substitution in accordance with structure II | | | | | | | | λmax [nm] | t | $E_\infty(450)$ |
|---|---|---|---|---|---|---|---|---|---|---|---|---|---|
| | | | $R'_7$ | $R'_8$ | $R'_9$ | $R'_{10}$ | $R'_{11}$ | $R'_{12}$ | $R'_{13}$ | $R'_{14}$ | | | |
| 62 | i-Propyl | i-Propyl | | | | | | | | | 662 | 50 | 0,01 |
| 63 | t-Butyl | t-Butyl | | | | | | | | | 663 | 30 | 0,01 |
| 64 | 1-Adamant. | 1-Adamant. | | | | | | | | | 668 | 60 | 0,02 |
| 110 | t-Butyl | t-Butyl | | Cl | | Cl | Cl | | CL | | 682 | 20 | 0,01 |
| 111 | t-Butyl | t-Butyl | $CH_3$ | | $CH_3$ | | | $CH_3$ | | $CH_3$ | 673 | 70 | 0,01 |

An evaluation of the structures represented by general structure II—without the ring between $R'_5$ and $R'_6$ corresponding to structure III—yielded analogous results.

Table 8 shows the results of experiments conducted on samples 65 to 78 and 114 to 129. These dyes correspond to structure II wherein n=O and $X_1$ as well as $Y_1$ =oxygen. $R'_1$, $R'_4$ and $R'_5$ compare phenyl groups; $R'_4$ and $R'_5$ are unsubstituted for all the samples in Table 8. For samples 65 to 78, all the other $R'$ and $R''$=H. For samples 114 to 129, individual substituents $R'_7$ to $R'_{10}$ =Cl, Br or $CH_3$; all further $R'$ and all $R''$=H.

TABLE 8

| Sample No. | Substitution on $R'_1$ (= Phenyl) | | | | | Further substitution in accordance with structure II | | | | max [nm] | t | E (450) |
|---|---|---|---|---|---|---|---|---|---|---|---|---|
| | (o) | (m) | (p) | (m) | (o) | $R'_7$ | $R'_8$ | $R'_9$ | $R'_{10}$ | | | |
| 65 | | | | | | | | | | 570 | 80 | 0,20 |
| 66 | Cl | | | | | | | | | 565 | 50 | 0,14 |
| 67 | | Cl | | | | | | | | 570 | 80 | 0,18 |
| 68 | Br | | | | | | | | | 562 | 30 | 0,12 |
| 69 | I | | | | | | | | | 562 | 30 | 0,12 |
| 70 | Cl | | Cl | | | | | | | 564 | 60 | 0,16 |
| 71 | Cl | | | Cl | | | | | | 562 | 50 | 0,15 |
| 72 | Cl | Cl | Cl | | | | | | | 559 | 50 | 0,15 |
| 73 | Cl | | | | Cl | | | | | 552 | 21 | 0,14 |
| 74 | | $CF_3$ | | | | | | | | 566 | 30 | 0,20 |
| 75 | | $CF_3$ | $CF_3$ | | | | | | | 563 | 30 | 0,18 |
| 76 | | CN | | | | | | | | 568 | 40 | 0,24 |
| 77 | $NO_2$ | | | | | | | | | 554 | 35 | 0,25 |
| 78 | $CH_3$ | | | | | | | | | 562 | 60 | 0,11 |
| 114 | | | | | | | Cl | | Cl | 574 | 50 | 0,25 |
| 115 | | | | | | Cl | Cl | | | 576 | - instabil - | |
| 116 | | | | | | Cl | | Cl | | 575 | - instabil - | |
| 117 | | | | | | Cl | Cl | Cl | | 582 | - instabil - | |
| 118 | | | | | | | | | Cl | 573 | 40 | 0,20 |
| 119 | | | | | | | Cl | | | 575 | 30 | 0,20 |
| 120 | | | | | | | Br | | | 577 | 25 | 0,16 |
| 121 | | | | | | | $CH_3$ | | $CH_3$ | 577 | 80 | 0,18 |
| 122 | Br | | | | | | Cl | | Cl | 562 | 25 | 0,15 |
| 123 | Cl | | | | | | Cl | | | 566 | 40 | 0,15 |
| 124 | Cl | | | | | | Br | | | 567 | 40 | 0,18 |
| 125 | Cl | | | | | | | | Br | 566 | 45 | 0,25 |

TABLE 8-continued

| Sample No. | Substitution on R'₁ (= Phenyl) | | | | | Further substitution in accordance with structure II | | | | $\lambda$max [nm] | t | E (450) |
|---|---|---|---|---|---|---|---|---|---|---|---|---|
| | (o) | (m) | (p) | (m) | (o) | R'₇ | R'₈ | R'₉ | R'₁₀ | | | |
| 126 | Cl | | | | | | | | Cl | 563 | 40 | 0,15 |
| 127 | Cl | | Cl | | | | Cl | | Cl | 558 | 25 | 0,15 |
| 128 | Cl | | | | Cl | | Br | | | 553 | 17 | 0,12 |
| 129 | Cl | | | Cl | | | Cl | | Cl | 547 | 18 | 0,14 |

Sample No. 65 is a known dye in which all the phenyl groups are unsubstituted.

Sample No. 128, wherein R'₁ is a phenyl group chlorine substituted at both ortho positions and with R'₈=Br, yielded the shortest bleaching time t. Samples 68, 69 and 78 yielded similarly good results with respect to the residual yellow colour with longer bleaching times, however. In each case only one ortho position of the R'₁ phenyl group was substituted.

With an equally short bleaching time, sample No. 129 yielded practically the same low level of bleaching residue, which indicates the favorable effect of halogenation in R'₈ and R'₁₀ quite apart from the advantageous influence of ortho chlorination on the R'₁ phenyl. (Compare with samples 122 and 127).

Samples 115 to 117 were unstable, probably because R'₇=Cl; compare this with samples 90 to 92 in Table 1a.

In Table 9 are listed the results for samples 79 to 81 and 130 to 142; these dyes also correspond to general structure II wherein n=O and X₁ as well as Y₁=oxygen, individual substituents R'₇ to R'₁₀=Cl, Br or CH₃, and all further R' and R''=H.

Especially good results were demonstrated by dye No. 138 wherein R'₁=phenyl monochlorinated in the ortho position and 81 wherein R'₁=phenyl chlorinated in both ortho positions.

It is worth noting, in addition, that dye 139 having phenyl methylated in both ortho positions as well as in the para-position as substitute R'₁ is not substantially worse. Moreover, it was noted that samples 132 to 134 appeared to be quite stable despite R'₇=Cl.

Table 9a indicates the results for samples 143 to 147. Dyes 143 to 146 correspond to structure II wherein n=O, X₁, Y₁=oxygen, R'₁=unsubstituted phenyl, R'₄ and R'₅=isopropyl. Sample 143 is the reference substance in which all other R' and R''=H. For samples 144 to 146 individual substituents R'₇ to R'₁₀ are Cl, Br or CH₃.

Sample 147 also corresponds to structure II, however R'₁, R'₄ and R'₄=t-butyl. All other R' and R''=H.

TABLE 9a

| Sample No. | Substitution with structure | | | | | | | $\lambda$max [nm] | t | $E_\infty$(450) |
|---|---|---|---|---|---|---|---|---|---|---|
| | R'₁ | R'₄ | R'₅ | R'₇ | R'₈ | R'₉ | R'₁₀ | | | |
| 143 | Phenyl | i-Propyl | i-Propyl | | | | | 534 | 145 | 0,05 |
| 144 | Phenyl | " | " | | Cl | | | 536 | 120 | 0,04 |
| 145 | Phenyl | " | " | | CH₃ | | CH₃ | 538 | 160 | 0,05 |
| 146 | Phenyl | " | " | | Br | | | 538 | 110 | 0,04 |
| 147 | t-Butyl | t-Butyl | t-Butyl | | | | | 512 | 90 | 0,04 |

Finally, experiments were carried out upon dyes corre-

TABLE 9

| Sample No. | Substitution on R'₁ (= Phenyl) | | | | | Further substitution in accordance with structure II | | | | $\lambda$max [nm] | t | $E_\infty$(450) |
|---|---|---|---|---|---|---|---|---|---|---|---|---|
| | (o) | (m) | (p) | (m) | (o) | R'₇ | R'₈ | R'₉ | R'₁₀ | | | |
| 79 | | | | | | | | | | 536 | 135 | 0,05 |
| 80 | Br | | | | | | | | | 525 | 110 | 0,04 |
| 81 | Cl | | | | Cl | | | | | 515 | 60 | 0,03 |
| 130 | | | | | | | Cl | | | 540 | 90 | 0,05 |
| 131 | | | | | | | | | Cl | 536 | 110 | 0,09 |
| 132 | | | | | | Cl | Cl | | Cl | 539 | 110 | 0,07 |
| 133 | | | | | | Cl | | Cl | Cl | 538 | 120 | 0,08 |
| 134 | | | | | | Cl | Cl | Cl | | 542 | 125 | 0,09 |
| 135 | | | | | | | Br | | | 540 | 90 | 0,05 |
| 136 | | | | | | | CH₃ | | CH₃ | 540 | 160 | 0,05 |
| 137 | | | | | | | Cl | | Cl | 538 | 85 | 0,04 |
| 138 | Cl | | | | | | | | | 527 | 25 | 0,02 |
| 139 | CH₃ | | CH₃ | | CH₃ | | | | | 520 | 30 | 0,04 |
| 140 | Cl | | | | | | Cl | | | 530 | 100 | 0,03 |
| 141 | Cl | | | | | | Br | | | 530 | 100 | 0,03 |
| 142 | Cl | | | | | | | | Cl | 527 | 90 | 0,03 |

(R'₄,R'₅ = t-Butyl)

In the case of dye No. 79, R'₁ is unsubstituted phenyl. For dyes 80 and 81 an ortho halogen substitution has been made.

For samples 79 to 81 and 130 to 142, R'₄ and R'₅=t-butyl. For samples 79 to 81 and 138, 139 all further R' and R''=H. For samples 130 to 137 and 140 to 142 sponding to general structure IV, wherein n=O, X₁, Y₂=oxygen, R'₁=phenyl (sample 82), substituted phenyl (sample 83) or t-butyl (sample 84); all other R' and R''=H. The results are shown in Table 10.

TABLE 10

| Sample No. | R'₁ | Substitution on R'₁ | | | | | lambda max [nm] | t | $E_\infty(450)$ |
|---|---|---|---|---|---|---|---|---|---|
| | | (o) | (m) | (p) | (m) | (o) | | | |
| 82 | Phenyl | | | | | | 606 | 30 | 0.05 |
| 83 | " | Cl | | | | Cl | 594 | 10 | 0.03 |
| 84 | t-Butyl | | | | | | 582 | 14 | 0.03 |

Compared to dye No. 82 which has unsubstituted phenyl as substitutent R'₁, chloro substitution at both ortho positions of the phenyl molecule yielded a clear improvement (sample 83). The result for sample No. 84 having t-butyl as substitutent R'₁ was insignificantly different.

To conclude, the investigations described show that in some cases, the proposed dyes cause an increase in light sensitivity but not an improvement in the yellow tone; in other cases both were obtained. The introduction of halogen substituents in the ortho position proved especially valuable when phenyl groups were introduced into the ring. The replacement of phenyl by t-butyl or carboxyl is likewise especially advantageous. These improvements are more striking in the case of the trimethenylcyanines than in the case of the monomethenylcyanines.

A film material suitable for use in photographic bleaching processes can be produced and employed in accordance with the following examples in which proposed dyes up to the dye PS can be used.

EXAMPLE 1

In 1l methylglycol were dissolved 100 g cellulose acetate hydrogen phthalate, 40 g polythylene glycol (average molecular weight 2000) and 40 g N-allyl-N'-(hydroxyethyl)thiourea as well as 1 g Tri(p-methoxyphenyl)pyrylium trifluoroacetate (U.S. Pat. No. 3,300,314). Then 1.2 g of sample 38 dye and 1.8 g of 63 sample dye were added to the starting solution in the form of trifluoroacetate. The resulting solution was spread with a blade into a 0.1 mm thick film upon PE-coated paper. After evaporation of the solvent, the black-appearing, light sensitive film had a thickness of approx. 20μm. By means of backlight exposure through a coloured original an orthochromic (positive) copy of the original was obtained. Subsequently, the copy was treated with water and thus rendered light insensitive (fixed).

EXAMPLES 2 TO 7

Additional films were prepared as described in Example 1 in which the following dyes were added to the starting solution; (Sample numbers are given as in the description.)
2: 0.9 g No. 40 and 1.8 g No. 58
3: 1.0 g No. 39 and 2.0 g No. 61
4: 1.5 g No. 62 and 1.2 g No. 103
5: 0.5 g No. 35; 0.5 g No. 43 and 1.5 g No. 63
6: 0.6 g No. 26; 0.5 g No. 43 and 1.5 g No. 62
7: 0.5 g No. 35; 1.5 g No. 61; 0.5 g No. 81 and 0.5 g No. 103

All these films yielded colour-true copies.

We claim:

1. A compound of the formula:

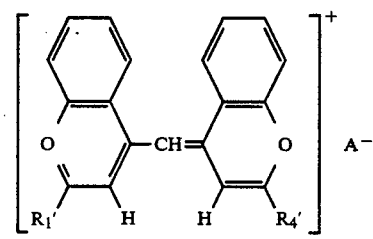

wherein
(a) R'₁ and R'₄ are independently selected from the group consisting of —COOH, —COOCH₃, —CONH₂, tert-C₄C₂—C₆H₅, and —C₆H₃Cl₂, with the proviso that either R'₁ or R'₄ is selected from the group consisting of —COOH, —COOCH₃, and —CONH₂; and
(b) A=anion.

2. The compound of claim 1 wherein R'₁=COOH and R'₄=—C₆H₅.

3. The compound of claim 1 wherein R'₁=COOCH₃ and R'₄=—C₆H₅.

4. The compound of claim 1 wherein R'₁=COOH and R'₄=ortho—C₆H₃Cl₂.

5. The compound of claim 1 wherein R'₁=CONH₂ and R'₄=tert—C₄H₉.

* * * * *